United States Patent
Carls et al.

(10) Patent No.: US 11,994,379 B2
(45) Date of Patent: May 28, 2024

(54) METHOD AND APPARATUS FOR DETERMINING A CONTOUR OF A FRAME GROOVE

(71) Applicant: Carl Zeiss Vision International GmbH, Aalen (DE)

(72) Inventors: Jörg Carls, Altdorf (DE); Oliver Schwarz, Ellwangen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 290 days.

(21) Appl. No.: 17/719,489

(22) Filed: Apr. 13, 2022

(65) Prior Publication Data

US 2022/0316870 A1   Oct. 6, 2022

Related U.S. Application Data

(63) Continuation of application No. PCT/EP2020/079067, filed on Oct. 15, 2020.

(30) Foreign Application Priority Data

Oct. 15, 2019 (EP) .................................... 19203172

(51) Int. Cl.
    *G01B 11/25*     (2006.01)
    *B24B 9/14*     (2006.01)
    (Continued)

(52) U.S. Cl.
    CPC .......... *G01B 11/2545* (2013.01); *B24B 9/144* (2013.01); *G02C 13/003* (2013.01);
    (Continued)

(58) Field of Classification Search
    CPC ......... G01B 11/2545; G06T 7/11; G06T 7/97; G06V 10/44; B24B 9/144; G02C 13/003
    (Continued)

(56) References Cited

U.S. PATENT DOCUMENTS

| | | |
|---|---|---|
| 5,307,150 A | 4/1994 | Lecerf et al. |
| 6,122,063 A | 9/2000 | Berndt et al. |

(Continued)

FOREIGN PATENT DOCUMENTS

| | | |
|---|---|---|
| DE | 4019866 A1 | 1/1992 |
| DE | 4224640 A1 | 2/1993 |

(Continued)

OTHER PUBLICATIONS

Intention to grant European patent application EP 20 789 181.3 dated Feb. 23, 2024, which is a counterpart hereof, and English-language machine translation thereof.

(Continued)

*Primary Examiner* — Michael A Lyons
*Assistant Examiner* — Omar H Nixon
(74) *Attorney, Agent, or Firm* — Tautz & Schuhmacher LLC; Georg Hasselmann

(57) ABSTRACT

A method for determining a contour of a frame groove in a rim of a spectacle frame includes illuminating the rim, capturing a plurality of images of the illuminated rim from different predetermined perspectives, evaluating the captured images, and determining a spatial curve of the frame groove based on the evaluated images. The rim is illuminated along the entire circumference of the rim by directed illumination. Moreover, the evaluation of the captured images includes assigning each portion contained in the captured images to a respective surface element of the frame groove on the basis of at least one of the following properties: shadowing of the respective portion, brightness of the respective portion and phase angle of the illumination of the respective portion. Moreover, an apparatus, a computer program, a method for grinding a spectacle lens, and a computer-implemented method for determining a geometry of a spectacle lens are disclosed.

24 Claims, 7 Drawing Sheets

(51) Int. Cl.
*G02C 13/00* (2006.01)
*G06T 7/00* (2017.01)
*G06T 7/11* (2017.01)
*G06V 10/44* (2022.01)

(52) U.S. Cl.
CPC ............... *G06T 7/11* (2017.01); *G06T 7/97* (2017.01); *G06V 10/44* (2022.01)

(58) Field of Classification Search
USPC ........................................................ 356/601
See application file for complete search history.

(56) References Cited

U.S. PATENT DOCUMENTS

| | | | |
|---|---|---|---|
| 6,247,753 | B1 | 6/2001 | Alvestad |
| 9,316,489 | B2 | 4/2016 | Hofmeister et al. |
| 2002/0041357 | A1* | 4/2002 | Farcy ............... G01B 11/24 359/201.1 |
| 2014/0240460 | A1* | 8/2014 | Hofmeister .......... H04N 13/189 348/46 |

FOREIGN PATENT DOCUMENTS

| | | |
|---|---|---|
| DE | 19727226 A1 | 10/1998 |
| DE | 19919311 C1 | 2/2001 |
| DE | 19937647 C1 | 7/2001 |
| DE | 102011114048 A1 | 3/2012 |
| DE | 102013010684 A1 | 12/2014 |
| FR | 2763707 A1 | 11/1998 |

OTHER PUBLICATIONS

Fitzgibbon A., "Stable Segmentation of 2D Curves", PhD thesis, pp. 1-117, University of Edinburgh, 1997.
Grompone R., et al., "A Sub-Pixel Edge Detector: an Implementation of the Canny/Devernay Algorithm," pp. 347-372, Image Processing on Line, vol. 7, IPOL, published online, Nov. 28, 2017.
Gupta, M., et al. "Micro Phase Shifting"; pp. 1-8, conference proceeding, IEEE Conference on Computer Vision and Pattern Recognition (CVPR), Jun. 2012.
Product manual https://www.zeiss.de/messtechnik/produkte/systeme/optische-messtechnik/o-select.html, relevance is found at least in paragraph [0144] of the specification, retrieved on Sep. 1, 2019.
Product manual https://applications.zeiss.com/C1257A26006EFF9E/0/A6DDC43030E4AAFBC1257F0100378040/$FILE/O-SELECT_DE_60_020_0003I.pdf, relevance is found at least in paragraph [0144] of the specification, retrieved on Sep. 30, 2019.
Product manual Kaizer HDM-800, retrieved from www.ftpuso.com/brochurepdf/Huvitz/HFR-8000.pdf, last accessed Apr. 12, 2022.
Online encyclopedia entry "Edge detection," available at https://en.wikipedia.Org/wiki/Edge_detection#Subpixel, retrieved on Sep. 30, 2019.
International Search Report issued in PCT/EP2020/079067, to which this application claims priority, mailed on Jan. 21, 2021, and English-language translation thereof.

* cited by examiner

METHOD AND APPARATUS FOR DETERMINING A CONTOUR OF A FRAME GROOVE

CROSS REFERENCE TO RELATED APPLICATIONS

This application is a continuation application of international patent application PCT/EP2020/079067, filed Oct. 15, 2020, designating the United States and claiming priority from European patent application 19 203 172.2, filed Oct. 15, 2019, both of which are hereby incorporated by reference in their entireties.

TECHNICAL FIELD

The present disclosure relates to a method and an apparatus for determining a contour of a frame groove in a rim of a pair of spectacles. The disclosure further relates to a computer program product and the use of an apparatus for determining the vertex power and/or the use of an apparatus for creating a spatially resolved optical power map. Therefore, the disclosure is in the technical field of spectacles in particular.

BACKGROUND

To grind spectacle lenses for mounting purposes, i.e., for adapting the spectacle lens to match the dimensions of the rim of the respective spectacle frame, the contour of the rim and, in particular, of the groove in the rim have to be measured so that the dimensions and the curve of the contour are available as digital information. The contour is subsequently used for grinding the spectacle lenses. Conventionally, the groove or rim is measured by means of a tactile tracer, a measuring needle of which is dipped into the groove of the rim, mechanically probes the latter and travels along what is known as a trace in the process. The information determined in the process is usually made available in the form of three-dimensional coordinates of the groove. As a rule, the measurement accuracy required is approximately $\frac{1}{10}$ millimeters or 100 μm in order to ensure the precisely fitting seat of the spectacle lens in the spectacle frame or in the groove.

For quite some time now, there has been a desire in the sector to simplify the workflow for the user and, in particular, to avoid the recalibration of the probe heads frequently required for tactile tracers. There have already been approaches to replace the tactile measurement for this purpose with an optical measurement, but none of the approaches were able to provide the required measurement accuracy and the reliability within an economical budget.

In this case, the requirements when determining the contours of the frame grooves include, inter alia, the ability to determine the contours for the two frame grooves of the spectacle frame separately from one another because tolerances in the manufacturing processes of the spectacle frames may lead to an asymmetry of the two rims which exceeds the tolerances for the grinding of the lenses. In particular, it is necessary to register asymmetries which lead to deviations between the rims of greater than 0.1 mm. The absolute geometric inaccuracy of the frame contour must be no more than 0.1 mm, such that the lenses ground on the basis of the determined contour are seated flush in the frame, that is to say without wobbling.

Additionally, it must be possible to detect the rims independently of the material and color of the frame and independently of the scattering or reflectance of the frame material.

DE19937647C1 has disclosed an apparatus and a method for determining the frame contour, in the case of which attempts are made to record different views of the groove by means of a camera and a device for producing a wobble movement. In this case, the wobble movement can a) be generated by stepper motors orb) by means of a rotatable mirror which is mounted below the camera and below the frame to be measured. A similar apparatus is known from DE4019866A1.

FR2763707A has disclosed an apparatus for determining the vertex power and the frame contour of a pair of spectacles, within the scope of which the pair of spectacles is illuminated from behind by means of a planar light source (e.g., a semitransparent screen). The 2D contour of the rim is determined on the basis of the silhouette visible in the camera image, with a few needles being introduced into the groove in a motor-driven fashion or by means of springs and the position of the needles being determined additionally for determining the contour of the groove.

DE4224640A has disclosed equipment intended to be used to optically reconstruct a groove shaped in the form of a "V." In this case, two parallel light beams are directed at the groove from two different angles by means of two light sources and appropriate optics, and the reflected or scattered light is recorded by a camera. The three distinguishing points of the "V" are reconstructed by means of triangulation. The frame groove is displaced into the measuring field by means of a turning device in each case.

U.S. Pat. No. 9,316,489B2 has disclosed equipment which is intended to be used to reconstruct the frame as a 3D model by means of a laser line, cameras, a linear drive and a rotary stage. A respective profile section is generated in each image recording. The entire 3D model arises from the overall set of profile sections.

DE19727226A1 has disclosed an apparatus for determining the spatial shape of the groove, within the scope of which a light beam or laser beam is directed centrically on the groove by means of deflection mirrors. The spatial shape of the groove is determined by means of triangulation. In this case, the frame must also be moved by means of a rotary stage. A respective profile section is generated in each image recording.

DE19919311C1 describes a method and an apparatus for contactless scanning of the groove in the opening of a spectacle frame, the groove being scanned through 360° in a first plane located above or below the plane of the opening of the spectacle frame or spectacle lens or the lens former, and also being scanned in a lowered and a raised plane.

Chapter 8 of the book by Bernd Jähne: "Digital Image Processing," Jan. 1, 2002, Springer Verlag, Berlin, illustrates the so-called aperture problem in motion analysis.

Moreover, various tactile tracers which can determine the contours of the two rims of a pair of spectacles with an accuracy of approximately 0.01 mm and an overall measurement time of approximately 30 s (for 16,000 measurement points, 2 frame openings) are known. In the process, a rotatably mounted stylus is guided along the groove. In so doing, a force is exerted on the groove, and hence on the rim, as described for example in "www.ftpuso.com/brochurepdf/Huvitz/HFR-8000.pdf," retrieved on Sep. 30, 2019.

None of the known methods or apparatuses are able to determine the overall contour and the profile of the groove within a short period of time, that is to say using only a few image recordings, with a target accuracy of 0.1 mm.

SUMMARY

Proceeding from DE19937647C1, it is an object of the present disclosure to provide a method and an apparatus which facilitate a reliable, simple, and cost-effective determination of the contour of a frame groove.

This object is achieved by a method, an apparatus, a computer program product for determining a contour of a frame groove in a rim of a spectacle frame. Exemplary embodiments are disclosed below.

In a first aspect, the disclosure relates to a method for determining a contour of a frame groove in a rim of a pair of spectacles. The method comprises illuminating the rim, capturing a plurality of images of the illuminated rim from different predetermined perspectives, and evaluating the captured images and determining a spatial curve of the frame groove on the basis of the evaluated images. The method is characterized in that the rim is illuminated along the entire circumference of the rim by means of directed illumination. Further, the method is characterized in that the evaluation of the captured images comprises assigning each portion contained in the captured images to a respective surface element of the frame groove on the basis of at least one of the following properties: shadowing of the respective portion, brightness of the respective portion and phase angle of the illumination of the respective portion.

In a further aspect, the disclosure relates to an apparatus for contactless determination of a contour of a frame groove in a rim of a pair of spectacles. The apparatus comprises an illumination device which is designed to illuminate the rim, an image capturing device which is configured to capture a plurality of images of the illuminated rim from different predetermined perspectives, and an image evaluation unit which is configured to evaluate the captured images and to provide the evaluated images for a determination of a spatial curve of the frame groove. The apparatus is characterized in that the illumination device is designed to illuminate the rim along the entire circumference of the rim with directed illumination and in that the evaluation of the captured images comprises an assignment of each portion contained in the captured images to a respective surface element of the frame groove on the basis of at least one of the following properties: shadowing of the respective portion, brightness of the respective portion and phase angle of the illumination of the respective portion.

In a further aspect, the disclosure relates to a computer program product comprising a non-volatile computer-readable storage medium on which an executable program code is stored, the latter being configured to prompt an apparatus to carry out a method according to the disclosure.

In a further aspect, the disclosure relates to the use of an apparatus for determining the vertex power or an apparatus for creating a spatially resolved optical power map for the purposes of determining a contour of a frame groove in a rim of a pair of spectacles or a spectacle frame.

In a further aspect, the disclosure relates to a method for grinding a spectacle lens into a spectacle frame, comprising a method according to the disclosure for determining a contour of the frame groove.

In a further aspect, the disclosure relates to a computer-implemented method for determining a geometry of a spectacle lens, comprising a method according to the disclosure for determining a contour (34) of a frame groove (12c) in a rim (12a) of a spectacle frame.

In this case, the rim is the surface of a spectacle frame which faces a spectacle lens inserted into the respective rim of the spectacle frame and which is adjoined by the spectacle lens. Expressed differently, the rim is the surface bounding the opening of the spectacle frame in which a spectacle lens can be inserted into the spectacle frame. In this case, the circumference of the rim is typically an inner circumference of the rim. The inner contour of the rim visible in an image is also referred to as the rim contour.

The frame groove, also referred to only as groove, in this case is a profile present in the rim which typically extends orthogonal to the rim. By way of example, the frame groove may be in the form of a notch and/or a milled depression in the rim. By way of example, the frame groove may have a V-shape in cross section, either exactly or approximately, with this information in respect of the approximate or assumed cross-sectional shape of the frame groove being able to be considered or incorporated when determining the contour of the frame groove.

In this case, the contour of the frame groove typically is a three-dimensional spatial curve which reflects the profile and/or the dimensions of the frame groove. By way of example, the spatial curve may be provided by means of three-dimensional coordinates, for example as a point set of spatial points, and in particular as a set of spatial curves. Here, a spatial point typically is a triple of three-dimensional coordinates which defines the position of the spatial point in a predetermined coordinate system. The predetermined coordinate system can typically represent a relative coordinate system, for example relative to an optical center of the image capture unit and/or relative to a position defined by a marker element.

In this case, the rim being illuminated along the entire circumference does not mean that the rim is sequentially swept by the illumination along its circumference but that the entire circumference of the rim is captured by the illumination. In particular, this can be achieved by virtue of the illumination being incident on the rim from the outside. There is no need to illuminate the rim from within, that is to say using a light source arranged in the opening of the rim. In this case, the entire circumference of the rim is typically illuminated simultaneously. The fact that the illumination may not penetrate into the frame groove in full under certain circumstances is not an obstacle to the illumination along the entire circumference. The rim being illuminated simultaneously along its entire circumference in this case means that the illumination is directed at the entire rim.

In this case, the directed illumination is illumination that is incident on the rim from a given direction. Particularly typically, the illumination may originate from a point light source and/or from a planar illumination from a predetermined direction. The directed illumination is chosen such that the latter creates shadowing which is as precise as possible on the frame groove. By way of example, directed illumination can be obtained by virtue of the spectacle frame only being incident from a direction relative to the image capturing device, for example by means of incident light from the direction in which the image evaluation unit is also arranged relative to the spectacle frame. To this end, the illumination device can provide the directed illumination by means of for example one or more point light sources, the illumination device illuminating the rim from a predetermined direction and creating shadowing which is as precise as possible on the frame groove. By way of example, a point light source can be in the form of an incandescent lamp and/or an LED an/or a laser diode an/or a laser. Alternatively or in addition, there may be provision of one or more light sources which facilitate transmitted light illumination for the rim. Expressed differently, light sources can optionally be provided for the incidence of illumination from the opposite direction of the spectacle frame, that is to say from the side of the spectacle frame that faces away from the image capturing device. To this end, the image capturing device may have a planar emitter, for example a display and/or an OLED lighting element. In particular, this may be advantageous for determining the contour of the frame groove in at least partly transparent spectacle frames. Planar light sources, such as a display and/or an OLED lighting element, in particular, may lend themselves to this purpose.

Here, the shadowing of the respective portions is a property of the respective portion which is caused by a different luminosity of the illumination incident on the portion or by the shadowing of the respective portion from the illumination. Different portions that are exposed to the illumination to a different extent and/or which are shadowed from the illumination to a different extent accordingly have different levels of shadowing and/or different levels of brightness. Consequently, different portions can typically be identified in the captured images on the basis of the shadowing (in the images), the portions typically being assigned to a surface element of the frame groove (in space). By way of example, transitions between different levels of brightness and/or levels of shadowing can be assessed as transitions between adjacent portions, which can subsequently also be assessed as transitions between adjacent surface elements. On the basis of these surface elements, it is subsequently possible to determine a plurality of spatial points (in space), which characterize the frame groove or, in particular, the relative position and dimension of the cross section of the frame groove. By way of example, the cross section of the frame groove can be acquired at each position of the frame groove along the profile of the frame groove by way of five spatial points, the surface elements extending between the spatial points. In a simplification, the contour extending at the base of the groove can be characterized by a single spatial point in the profile section. In another simplification, the cross section of the groove profile can be characterized by three spatial points only, with one of the spatial points characterizing the groove base in the cross section and the two further points characterizing the respective transitions between groove flank and rim. According to further embodiments, it is also possible to detect more than five spatial points in order to model the cross-sectional profile of the frame groove.

By way of example, in this case a surface element is a contiguous region of a virtual and/or mathematical representation of the contour assigned to a portion in the captured image which is recognized or assessed as a contiguous portion on account of homogeneous or approximately homogeneous properties in respect of the shadowing and/or brightness and/or phase angle of the transmitted and/or reflected illumination and which thereby is delimited from other surface elements.

In particular, shadowing is a brightness profile in the captured images. By way of example, the shadowing may be present as or comprise a linear brightness profile. Typically, it is also possible to use different image filters, for instance to generate further image channels and/or to carry out a segmentation and/or evaluation of the images on the basis of the image channels generated thus. By way of example, the illumination device can provide phase-shifted illumination such that phase images and/or amplitude images and/or curvature images can also be calculated in the case of images captured with mutually phase-shifted illumination.

By way of example, the phase angle of the illumination of the respective portion is a relative phase angle of the captured illumination in relation to other portions in the captured image. By changing the phase of the illumination, it is possible for example to particularly accurately detect the spatial profile of the groove or of the rim. To capture the phase angle, it may be particularly advantageous to illuminate at least partly transparent spectacle frames using transmitted light illumination since the shadowing can be determined particularly reliably in this case.

In this case, the different predetermined perspectives from which the images are captured are advantageous in relation to determining the accurate relative position of the surface elements and/or the spatial points in space, for example by means of triangulation. In particular, the set of spatial curves is determined on the basis of the spatial points. By way of example, a spatial curve in this case extends through the spatial points which are located at the respective corresponding cross-sectional position of the frame groove or contour along the profile of the frame groove. Consequently, the spatial curves typically extend parallel to the contour or the frame groove such that the set of spatial curves includes the respective surface elements and corresponds to the contour of the frame groove. Additionally, it may be advantageous to capture a plurality of images in which the directed illumination is incident on the rim from different predetermined perspectives since this allows the shadowing to be determined particularly reliably.

In this case, an apparatus for determining the vertex power is a vertex power measuring device or a lens meter, for example. Such an apparatus can be used to measure the vertex power of a spectacle lens, with the optical power at the vertex of the spectacle lens being able to be determined in the form of an individual value.

By way of example, the image capturing device may comprise one or more sensors and/or cameras. By way of example, a separate sensor and/or a separate camera may be provided for each rim. Alternatively or in addition, a sensor and/or a camera that is able to simultaneously capture both rims may be provided.

The image evaluation unit and the geometry evaluation unit may be in the form of a computing unit and/or may be implemented in a computing unit. In this case, the image evaluation unit and the geometry evaluation unit may be assigned to a single computing unit or to separate computing units.

The disclosure offers the advantage that the contours of the frame grooves in a spectacle frame can be determined optically using only a few image recordings. The disclosure also offers the advantage that the contours of the frame grooves can be determined particularly accurately and reliably on account of the utilized directed illumination since a high optical contrast, in particular, can be obtained. The disclosure also offers the advantage that a particularly reliable automated recognition of surface elements can be implemented by evaluating the shadowing in the captured images. Consequently, the disclosure offers the advantage of providing a reliable, simple and sensitive option for determining the contour.

For the sake of completeness, attention is drawn to the fact that the disclosure does not require mechanical probing of the frame groove to be undertaken. Accordingly, the contour of the frame groove is typically determined contactlessly. This offers the further advantage of being able to obtain particularly high accuracy since there is no risk of the spectacle frame deforming on account of mechanical probing; this is advantageous in the case of very thin rims in particular. Since, in contrast to mechanical tracers for example, there is no need for manually adjusting the apparatus, particularly high reliability and dependability, and a low susceptibility to operating errors, may also be realized as a result. Additionally, the disclosure facilitates a particularly fast determination of the contour since typically only a few image recordings are required.

Further, the disclosure offers the advantage of requiring no mechanical positioning units that require highly precise calibration. This can avoid significant adjustment outlay and reduce the susceptibility to errors. This may also reduce maintenance costs.

Moreover, the disclosure offers the advantage of being able to determine a three-dimensional contour of the frame groove in the profile section or cross section, consequently allowing this to be taken into account when grinding the lenses. As a result, spectacle lenses can be adapted to match the spectacle frame particularly accurately during the grinding in order to obtain the best possible hold of the spectacle lenses in the frame. Additionally, determining the three-dimensional contour facilitates reliable and precise grinding of spectacle lenses for significantly curved frames, for which a contour merely determined in two dimensions may not be sufficient in certain circumstances. Further, the glass design can be optimized on the basis of the contours of the frame grooves and rims so that the lenses of the finished pair of spectacles also meet optional esthetic requirements. By way of example, this can be achieved by virtue of the lenses of the finished pair of spectacles terminating as exactly as possible with the front edge of the rim.

The glass design is understood to mean the spatial embodiment or geometry of the spectacle lens, as exhibited by the spectacle lens following completion. By way of example, the glass design may depend on the prescription power, the material of the spectacle lens and the contour of the spectacle frame in which the lens is intended to be inserted. Additionally, the glass design may depend for example on other parameters, for example the relative position of the visual points and/or the expected viewing habits of the user, which may then be considered when creating the glass design.

The disclosure also offers the advantage that the contour of the frame groove can be determined independently of the ambient light by using an illumination device. In this way, reliably repeatable results may be obtained even under different ambient light conditions.

Moreover, the disclosure offers the advantage that the contour(s) of the frame groove(s) can be detected very quickly. Particularly typically, only a few image recordings are required to register the contours. Additionally, the disclosure may offer the advantage that very large or long sections of the contour of the frame groove are able to be registered as a respectively contiguous portion or surface element. By way of example, at least one surface element may extend over at least 10° of the internal angle of the rim.

Further, the disclosure typically comprises a determination of a set of spatial curves on the basis of the surface elements assigned in the respective images, the set of spatial curves corresponding to the contour of the frame groove. This offers the advantage that the contour can be determined and/or reproduced particularly accurately and reliably.

Typically, the method further comprises a determination of a plurality of spatial points on the basis of a linking of the surface elements correspondingly assigned in the respective captured images, which precedes the determination of a set of spatial curves, the set of spatial curves being determined in such a way that the spatial curves each run through at least some of the spatial points. As a result, the spatial curves can be determined particularly precisely.

Typically, the directed illumination comprises at least one of the following features: collimated illumination, structured illumination, transmitted light illumination, incident light illumination, ultraviolet illumination and polarized illumination. This offers the advantage of being able to provide particularly defined illumination offering a plurality of parameters, which allows the captured images to be evaluated. In this case, directed illumination is for example illumination that is incident on the rim from one direction. Directed illumination can typically be provided by means of a point light source. In this case, the directed illumination has the effect of creating precise shadowing on the frame groove, which has precisely assignable shadowing of the portions as a consequence. By way of example, the illumination device may comprise one or more incandescent lamps, an LEDs and/or a laser diodes. Typically, the illumination device comprises at least one of the following illumination elements: slide projector, digital fringe projector, laser line projector and laser point pattern projector. By way of example, an illumination device for the directed illumination may comprise for example one or more LEDs. The position of the LED illumination is typically positioned up to 90° out of the plane of the cameras in order to obtain sufficient scattering of the light at the rims into the field of view of the illumination device. Optionally, the illumination device may comprise one or more light sources for transmitted light illumination, which are optionally arranged on the side of the rim that faces away from the image capturing device. By way of example, these may be in the form of planar emitters. This offers the advantage that incident light and transmitted light measurements can be combined for at least partly transparent spectacle frames.

Typically, the evaluation of the images may comprise filtering the captured images and/or the implementation of other preprocessing steps, in particular in the image channels. In particular, the image channels may be output images of phase-shifting processing of fringe images, that is to say of output images which on the basis of input images which were recorded with an illumination of the rim with structured illumination, for instance a fringe projection, and subsequently evaluated using phase shifting algorithms. In such fringe images, the base intensity, the amplitude image and the phase image are typically available as separate image channels. By way of example, this may be advantageous for the further processing and/or evaluation of the images, and/or simplify and/or improve the geometry evaluation. The use of "micro-phase shifting" methods is particularly advantageous in this context; see M. Gupta and S. K. Nayar, "Micro Phase Shifting," 2012 IEEE Conference on Computer Vision and Pattern Recognition, Providence, RI, 2012, pp. 813-820, doi: 10.1109/CVPR.2012.6247753.

The evaluation and/or capture of images may typically comprise the summation and/or subtraction of a plurality of images. By way of example, mean values of the pixel brightness can be calculated for a plurality of captured images and one or more images composed of such mean values can be used for the further image evaluation.

According to a further exemplary embodiment, the device can be designed to provide a collimated illumination of the rims, for example by means of a laser line projection. To this end, typically optical features are projected onto the rims, the optical features being able to be related to one another in the captured images from the various perspectives and simplifying the determination of the contour. This offers the advantage that the illumination can be provided in particularly defined fashion.

By way of example, the collimated illumination can be provided by means of a laser diode or by means of a laser. Alternatively or in addition, a collimated illumination can be obtained by means of lenses and/or curved mirrors when proceeding from a divergently or convergently emitting light source.

By way of example, structured illumination can be obtained by projecting and/or imaging a pattern onto the rim. By way of example, a line pattern and/or point pattern may be projected and/or imaged onto the rim, facilitating a reliable determination of the contour. By way of example, the structured illumination can be provided by means of an illumination device which comprises a slide projector, in particular for projecting a static pattern, and/or a digital fringe projector and/or a laser line projector and/or a laser point pattern projector. By way of example, the image evaluation unit can be configured to determine the image positions of the projected pattern features in the image. By way of example, the geometry evaluation unit can be configured to in each case calculate or determine the spatial position of the respective feature from the image positions of corresponding or linked image features, and to determine for example the contour therefrom. Optionally, at least two different arrangements of the structured illumination are projected onto the rim, with at least one image being captured from each of the different perspectives in each arrangement such that each part of the rim is captured at least once as an image in different structures of the structured illumination. By way of example, it is possible firstly to capture images in which some parts of the rim are located in a dark region of a projected fringe illumination and secondly to capture images in which the same parts are located in a bright region of the projected fringe illumination. To change the arrangement of the structured illumination it is possible in particular to vary the phase of the fringe illumination. This means that the periodically varying luminous intensity of the fringe pattern is altered at least partly perpendicular to the direction of extent of the fringes, that is to say not parallel to the direction of extent of the fringes, as a result of which the fringes are shifted or "migrate through the image." By way of example, micro phase shifting, as known to a person skilled in the art from the prior art, can be used in the process (see for example M. Gupta et al. "Micro Phase Shifting"; IEEE Conference on Computer Vision and Pattern Recognition (CVPR), pp. 1-8, June 2012). This phase shifting allows all portions of the rim captured by the projected fringe illumination to be captured at least once in a dark part of the illumination and at least once in a bright part of the illumination. In this case, the phase is the phase of an at least approximately sinusoidal intensity curve of the fringe pattern.

The illumination using a pattern can typically be combined with the image capture of an image using collimated illumination, for example in order to be able to reliably apply the principle of edge detection. This offers the advantage of being able to facilitate a particularly reliable determination of the contour. By way of example, if a digital fringe projector is used for the pattern projection, it is possible to capture a series of phase-shifted fringe images, typically using the known method of phase shifting fringe projection. From these images, it is possible to calculate an averaged image (what is known as a base intensity) and/or a gradient image of phase gradients and/or an image of amplitude values, for example using known methods (for instance, averaging a respective pixel over all images in each case). Accordingly, the amplitude image channel of the fringe image or fringe images can be used for the edge detection. The edge detection can be applied particularly advantageously thereto since, compared to a regular grayscale value image, further information that is useful for the edge detection is additionally provided. In particular, the contrast in the amplitude image is particularly detailed, as is the curvature intensity which is rendered visible by deriving and evaluating the curvature information from the phase image.

By way of example, transmitted light illumination can be obtained by illuminating the rim from the side of the rim opposite to the image capturing device. Transmitted light illumination can be advantageous, in particular, in the case of partly transparent spectacle frames, in which the illumination can at least partly penetrate through the spectacle frame and in particular at least partly penetrate through the rims. The advantage lies in the fact that a reliable determination of the contour is facilitated even if a lack of reflectivity of the spectacle frame renders a determination using only incident light illumination impossible or only possible with difficulties.

Incident light illumination can be implemented, in particular, by illuminating the rim from the same side of the rim on which the image capturing device is also arranged. By way of example, the optical axes of the light source and the image capturing device may be located exactly or approximately in a plane. Incident light illumination offers the advantage of being able to capture light that is reflected and/or scattered by the rim. Incident light illumination may be particularly advantageous for non-transparent rims, through which the illumination cannot penetrate or at least cannot penetrate to a sufficient extent.

By way of example, ultraviolet illumination can be provided, for example, by means of a UV lamp and/or by means of a laser. Ultraviolet illumination can be advantageous, in particular, to the effect of being able to reduce reflective effects, particularly on metallic surfaces.

By way of example, polarized illumination can be achieved by using a light source emitting in polarized fashion and/or by means of a polarization filter. The polarized illumination typically is a linearly polarized illumination. This offers the advantage that the reflection properties of the illumination can be adapted to the rims and/or can be varied. In this case, too, a certain polarization may be advantageous to the effect of being able to obtain an accentuation of intensity differences or brightness differences between different portions or segments of the rim and/or being able to obtain a suppression of disruptive reflections.

Typically, the illumination comprises a switchable illumination of the rim such that rims of both transparent or semitransparent materials, and of non-transparent materials such as metal, for example, can be recorded in such a way that the various surface segments are distinguishable in the captured images. In this case, a transmitted light illumination (what is known as a backlight) is typically used in the case of semitransparent materials while an incident light illumination is typically used in the case of opaque or non-transparent materials, for example metal, since, optionally, transmitted light in the case of semitransparent materials and reflected light in the case of opaque materials supplies a higher optical contrast. The strength of the illumination, that is to say the illumination intensity, is particularly advantageously adaptable to the degree of absorption of the material—the illumination intensity can be increased in the case of significant absorption and the illumination intensity can be reduced in the case of significant reflectivity or scattering.

Typically, the captured images are at least partly evaluated by means of image segmentation. This offers the advantage of being able to achieve a particularly reliable automated image evaluation. In this case, the image segmentation optionally comprises the following steps: rim segmentation or segmentation of the frame, detection of the contour of the inner rim, edge detection and completion of edges of the groove profile by means of a mathematical optimization method.

The rim segmentation or segmentation of the frame can be implemented for example by means of a foreground/background segmentation, for the purposes of which transmitted light illumination may be particularly advantageous. In this case, an image of the silhouette of the frame is typically generated by virtue of the frame being placed between illumination and camera and the frame standing out against the background. In the image, pixels of the silhouette of the frame are darker than the background. Consequently, the frame can be segmented by way of a thresholding method, the result of which is a binary image. To further improve the contrast, the difference image between the silhouette image and an empty background image without frame can for example be formed before the thresholding and binarization. The contour line of the inner rim can typically be derived from the binary image by means of conventional edge extraction methods, for example by means of morphological operators. To further increase the accuracy, a sub-pixel accurate edge detection can typically be carried out in the region of the rim contour. A subpixel canny method can be used, for example, as in the document "Stable Segmentation of 2D Curves," Andrew W. J. Fitzgibbon, PhD thesis, 1997, University of Edinburgh.

The edge detection of edges belonging to the groove profile can be implemented, in particular, within the segmented rim or the binary image of the frame and can prefer the detection of edges extending parallel or virtually parallel to the contour line of the inner rim. Here, directional vectors which can be calculated, for example, by forming a gradient or determining a straight line fit are typically assigned to points or sections of the respective line. Edge sections whose directional vectors deviate more significantly than a given maximum angle are optionally removed from the further calculation.

The completion of edges by means of a mathematical optimization method may comprise the minimization of a cost function, for example. A model of the contour lines to be determined containing free parameters is typically used in this case. By way of example, a V-shaped cross section of the frame groove can be assumed and can be included in the optimization method. The distances of the edges from the model are typically included in the cost function as a data term. By way of example, a least squares approach can be chosen to this end. A set of parameters for which the cost function is minimized is typically determined within an optimization loop. Optionally, further terms which, e.g., assess the smoothness of the respective contour line can be included in the cost function for regularization purposes. By way of example, the model may comprise a complex-valued Fourier series, with the free parameters determining the coefficients of the series and real and imaginary parts respectively encoding the x- and y-values of the contour points. Further usable contour models may be based on, for example, polynomial splines, NURBS or conic sections.

Typically capturing the images from the different predetermined perspectives comprises capturing images from different predetermined observation angles about an axis of rotation. This offers the advantage that different perspectives can be adopted with particularly little outlay and/or in particularly reliable fashion. To this end, for example, the spectacle frame can be arranged at different angles in relation to the image capturing device. By way of example, the spectacle frame can be pivoted into different positions to this end. Typically, the axis of rotation for pivoting the spectacle frame extends parallel to the upper edge of the spectacle frame. Alternatively or in addition, however, it is also possible to alter the position of the image capturing device in order to facilitate the capture of images from the different perspectives and/or observation angles. It is also possible to use a plurality of image capturing device which facilitate the capture of images from different predetermined observation angles or perspectives without needing the spectacle frame and/or the image capturing device to be pivoted and/or displaced.

Optionally, the spectacle frame is arranged at different angles in relation to the image capturing device in the different perspectives. This provides the option of capturing the spectacle frame from different angles using the image capturing device. From some of the different angles, it is then optionally possible to view portions of the spectacle frame which possibly were not able to be viewed from different angles and perspectives. As a result, the observation of the spectacle frame from different perspectives can be realized in a simple and effective manner.

Optionally, the spectacle frame is pivotable about the axis of rotation, the axis of rotation extending parallel to the upper edge of the spectacle frame. This allows the frame groove to be visible from different angles or perspectives even if the image capturing device is arranged outside of the rim. Expressed differently, it is not necessary to position the image capturing device within the rim, that is to say in a region provided for a spectacle lens to be inserted. Rather, it is sufficient to observe the rim from the outside using the image capturing device. This can keep down the complexity of the apparatus for contactless determination of a contour of a frame groove in a rim, and, moreover, a large region of the rim or of the frame groove can be captured simultaneously by the image capturing device. Optionally, the entire rim can be captured simultaneously in this case.

Optionally, the images are captured from the different perspectives on the basis of altered positions of the image capturing device. Expressed differently, the position and/or orientation of the image capturing device relative to the spectacle frame is optionally altered for the purposes of capturing the images from the different perspectives, and/or the position of the spectacle frame is optionally altered relative to the image capturing device. This facilitates a simple realization and technical implementation of the capture of the images from the different perspectives.

Optionally, the images are captured from different predetermined observation angles using a plurality of image capturing devices. This offers the option of simultaneously capturing images of the rim from a plurality of perspectives. Optionally, this avoids the requirement of bringing about a change in the relative position and/or orientation of the spectacle frame relative to the image capturing device. This can reduce the amount of time required for determining the contour of the frame groove.

Optionally, the plurality of images are captured in such a way that the image capturing device captures two rims of a spectacle frame in the image region. This can save time since it is not mandatory for the two rims to be captured in two separate measurements. Likewise, the image evaluation for the two rims can be implemented in one procedure without having to evaluate a plurality of different images for the individual rims.

Typically, a marker element is further provided, the latter being arranged in such a way at a uniquely predetermined position that unique positioning of the rim relative to the marker element is determinable by means of the captured images. This offers the option of determining the unique position of the spectacle frame, and hence the contour of the frame groove relative to the image capturing device, by means of the marker element. To this end, the marker element typically has a precisely defined position relative to the image capturing device. Consequently, it is possible to determine the relative position of the spectacle frame with respect to the image capturing device on the basis of the relative position of the spectacle frame with respect to the marker element.

Typically, the marker element has at least one distinguishing feature which can be located with great accuracy in captured images from the image capturing device and, should the latter comprise a plurality of cameras, in the images of all cameras involved, and which has a fixed spatial relationship with the rim. This offers the advantage of facilitating a simple orientation and/or determination of position in the captured images. In particular, the image position of this marker element is determined in order to determine the relative position and orientation of the rim in relation to the involved cameras. This facilitates a cost-effective realization of the tilt device as it is possible to dispense with repeatably accurate positioning of the spectacle frame in the apparatus. Further, this facilitates the use of cost-effective mechanical components, for instance a cost-effective holding apparatus. The marker element can typically have a partly transparent design, to allow one or more distinguished features to be determined in both incident light illumination and transmitted light illumination. In this case, a distinguished feature is a feature whose position can be uniquely determined with great reliability and great accuracy in the captured images.

Typically, the apparatus comprises a holding apparatus, the holding apparatus being designed to hold the pair of spectacles both fixed in position and fixed in orientation relative to the illumination device and relative to the image capturing device. The image capturing device optionally being arrangeable in a plurality of different positions relative to the rim is not an obstacle thereto since the positioning fixed in position and fixed in orientation relates to a respective fixed arrangement of the image capturing device in one of the various perspectives. Typically, the holding apparatus is further designed to hold the pair of spectacles in at least two different orientations relative to the illumination device and relative to the image capturing device, the at least two different orientations defining different predetermined observation angles of the image capturing device in relation to the rim. Particularly typically, the image capturing device is designed to rotate or pivot the spectacle frame about an axis of rotation in order to allow the image capturing device to capture images of the illuminated rim from at least two different predetermined perspectives, and particularly typically from a plurality of different predetermined perspectives.

Typically, the holding apparatus comprises a spectacles holder with a spring element for stable holding of the pair of spectacles in different pivot positions. This facilitates simple fastening and removal of the pair of spectacles, and a secure hold of the pair of spectacles while the contour of the frame groove is determined.

Typically, the apparatus according to the disclosure is further designed to determine at least one of the two following properties of spectacle lenses of a pair of spectacles held in the apparatus: vertex power and spatially resolved optical power map. Expressed differently, the apparatus is typically designed as a vertex power measuring device and/or as an apparatus for measuring a spatially resolved optical power map and can be used in a further function to determine the contour of a frame groove or to determine the contours of both frame grooves. This offers the advantage that one and the same piece of equipment can be used for a plurality of purposes and, accordingly, that the number of pieces of equipment required for adjusting and/or completing a pair of spectacles can be reduced. In particular, this offers the advantage that, particularly typically, the same illumination device, the same image evaluation unit and the same holding apparatus can be used for the various purposes.

Typically, the contours of the two frame grooves, that is to say the respective frame groove in each rim, can be determined within the scope of a measurement. Particularly typically, the two contours can be detected simultaneously. This facilitates a particularly fast determination of the contours. By way of example, the image evaluation unit can be configured to capture both rims in each image recording. By way of example, to this end, the image capturing device may be designed to capture the two rims in the image region. Alternatively or in addition, the image capturing device may comprise a plurality of sensors and/or cameras in order to capture each rim with a separate sensor and/or a separate camera. Typically, the image capturing device comprises at least two cameras. Particularly typically, each of the two cameras is aligned such that the optical axis of the respective camera extends through one of the two rims or contours or through the opening in the pair of spectacles spanned by the respective rim.

Typically, the image capturing device comprises at least one "high dynamic range" (HDR) camera. Alternatively or in addition, the image capture comprises recording of in each case a plurality of images per arrangement or pivot position of the spectacle frame using a series of illumination states (e.g., different illumination intensities) such that both the transition from the rim into the groove and the groove base are each rendered clearly visible in at least one of the images with a suitable illumination state in the series of the illumination states.

Optionally, the image capturing device comprises at least one camera, wherein the optical axis of the at least one camera extends through one of the two rims or contours or through the opening of the pair of spectacles spanned by the respective rim. In this case, the at least one camera is directed at the opening of at least one of the rims. As a consequence, the rims can be observed from the outside and, as a consequence, it is not necessary for the camera to be positioned within the rim, that is to say in the region provided for the spectacle lens to be inserted.

Typically, distances between the spatial curves of the set of spatial curves are interpolated in order, for example in the case of local concealment of the contours in the image, nevertheless be able to completely determine the contour. This is advantageous, in particular, in the case where the tilt or pivoting of the spectacle frame about a horizontal axis is restricted since the contours at the left and right rims may be concealed in all rotational positions in this case. The same typically applies to the upper/lower rims in the case where the rotation about a vertical axis is restricted.

There typically is an iterative application of the image evaluation unit and the geometry evaluation unit within an optimization loop, the results of the geometry evaluation unit in each case being used so as to be included in the image evaluation unit as further input. Expressed differently, the steps of evaluating the captured images, determining the plurality of spatial points and determining the set of spatial curves are carried out repeatedly within an iteration loop. The advantage of the image evaluation unit optionally extended in this way lies in making the detection results more precise—this allows the results of the edge detection to be improved, especially in regions with a low contrast.

Typically, the geometry evaluation unit is further configured to determine a plurality of spatial points on the basis of a linking of the surface elements correspondingly assigned in the respective captured images, which precedes the determination of the set of spatial curves, and to determine the set of spatial curves in such a way that the spatial curves each run through at least some of the spatial points. This offers the advantage of allowing the spatial curves to be determined particularly precisely.

It is understood that not only should the aforementioned features and embodiments and features and embodiments explained below be considered disclosed in the respective explicitly mentioned combinations but that other technically expedient combinations and embodiments are also comprised by the disclosure.

BRIEF DESCRIPTION OF THE DRAWINGS

The disclosure will now be described with reference to the drawings wherein.

DESCRIPTION OF EXEMPLARY EMBODIMENTS

Figure 1:
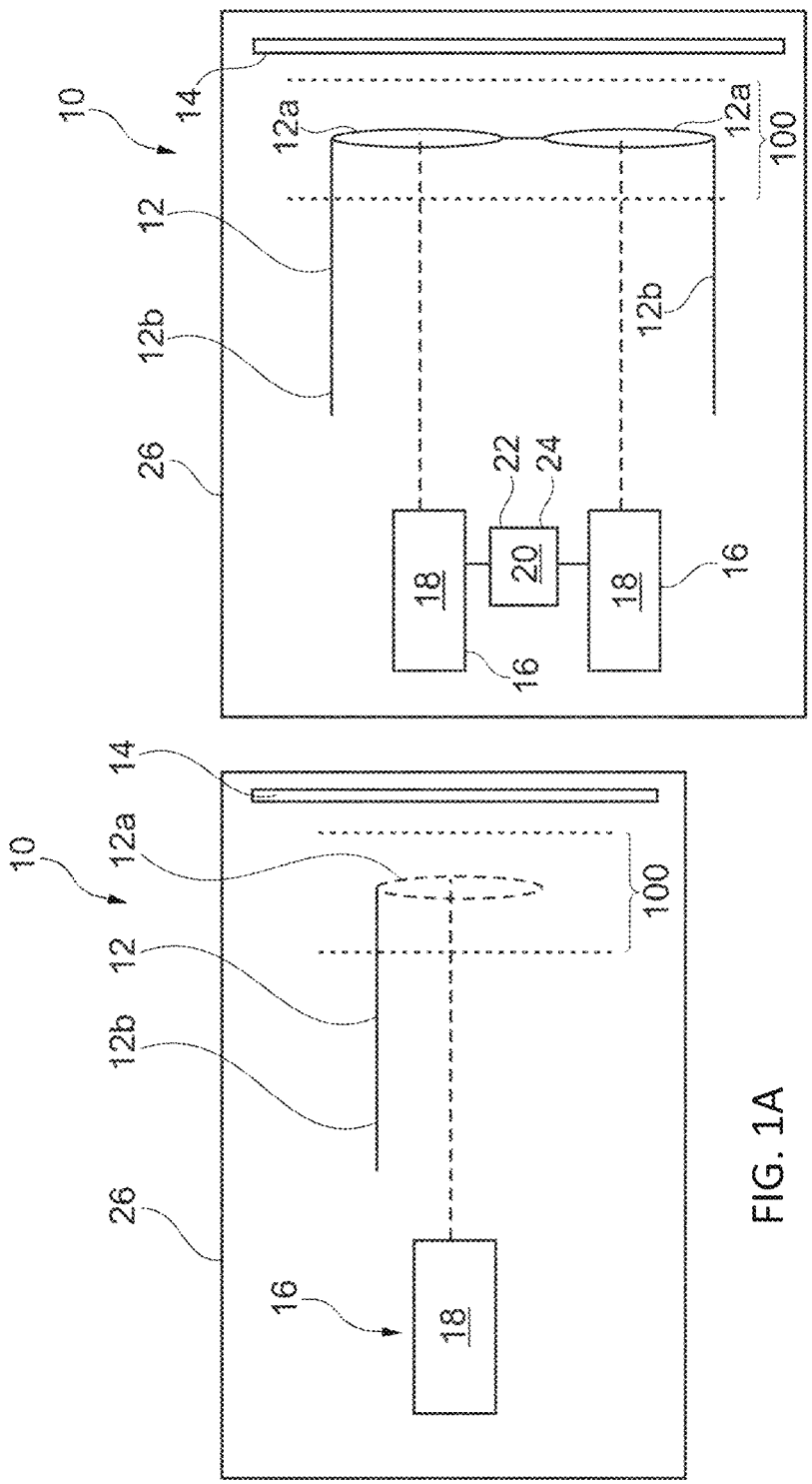
FIG. 1A shows an apparatus 10 for contactless determination of a contour of a frame groove in a side view.
FIG. 1B shows apparatus 10 in a plan view.

FIGS. 1A and 1B show a schematic representation of an apparatus 10 for contactless determination of a contour of a frame groove in a rim of a spectacle frame 12 in a side view (FIG. 1A) and in a plan view (FIG. 1B), respectively, according to an exemplary embodiment.

The apparatus 10 comprises an illumination device 14, which is in the form of a display according to the exemplary embodiment shown. By way of example, the display may comprise a commercially available computer display or may be designed as such. The illumination device 14 is designed to provide the rim of the spectacle frame 12 with directed illumination as transmitted light illumination along the entire circumference of the rim 12a. In this case, the spectacle frame 12 comprises two rims 12a and two temples 12b. According to other embodiments, the apparatus 10 may comprise a further illumination device and/or light source designed to provide incident light illumination such that the light is incident on the spectacle frame 12 from the side of the spectacle frame 12 that faces the image capturing device.

Further, the apparatus 10 comprises an image capturing device 16, by means of which a plurality of images of the illuminated rims 12a can be captured. In this case, the spectacle frame 12 is arranged between the image evaluation unit 16 and the illumination device 14 such that the directed illumination provided by the illumination device 14, as transmitted light illumination, at least partly passes through the rim 12a or the rims 12a of the spectacle frame 12 and is captured by the image capturing device 16. According to the exemplary embodiment shown, the image capturing device 16 comprises two optical cameras 18 which are arranged in such a way that their optical axes extend through the openings spanned by the rims 12a the spectacle frame 12. In this case, the cameras 18 are set in such a way that the rims 12a of the spectacle frame 12 are arranged within a focal range 100 of the camera 18 such that the image capturing device 16 is able to capture a sharp or focused image representation of the rims 12a. In this case, the two cameras 18 are arranged next to one another in such a way that their lateral spacing approximately corresponds to the distance between the two centers of the openings spanned by the rims 12a. However, other arrangements of the cameras 18 that facilitate imaging of the rims 12a are also possible.

According to other exemplary embodiments, the image capturing device may also comprise only one camera or sensor, or more than two cameras or sensors, by means of which images of the rims 12a can be captured. Alternatively, the apparatus 10 may according to other embodiments be designed to determine only the contour of the frame groove of one of the two rims 12a of a spectacle frame 12. Using such an apparatus, the contours of the two grooves of the rims 12a can subsequently be captured sequentially in succession.

Further, the image capturing device 16 is pivotable in such a way that the image capturing device 16 can capture images of the rims 12a from different predetermined perspectives. Alternatively or in addition, the apparatus 10 can comprise a suitable holding apparatus, by means of which the spectacle frame 12a can be arranged in different orientations in order to encompass images from different predetermined perspectives using the image capture device 16.

According to the exemplary embodiment shown, the apparatus 10 further comprises a computing unit 20, in which an image evaluation unit 22 and a geometry evaluation unit 24 are integrated or implemented. According to another embodiment, the image evaluation unit 22 and the geometry evaluation unit 24 may also be formed in separate computing units. The computing unit in this case has a data communications link to the image capturing device in order to receive and evaluate the captured images.

The image evaluation unit 22 evaluates the images captured and provided by the image capturing device 16 and assigns each portion contained therein to a respective surface element of the frame groove. The assignment is implemented on the basis of the shadowing and/or the brightness of the respective portion.

The geometry evaluation unit 24 subsequently determines a plurality of spatial points in space, that is to say in the object space of the spectacle frame 12, on the basis of a linking of the surface elements in the captured images from different perspectives, and determines a set of spatial curves. This linking can typically be implemented by means of triangulation. Each spatial curve extends through at least some of the spatial points. In this case, the set of spatial curves corresponds to the contour of the frame groove.

Moreover, the apparatus 10 comprises a housing 26 which encloses the other components of the apparatus 10. Typically, the housing 26 is opaque and designed in such a way that the components of the apparatus 10 arranged within the housing 26 are shielded from ambient light. This offers the advantage of being able to avoid a disruptive background illumination when determining the contour(s), and therefore allows the accuracy and/or reliability of the determination to be increased. Additionally, the contour(s) can be determined independently of the brightness and/or the illumination of the surroundings.

Typically, the apparatus 10 according to the exemplary embodiment shown is an apparatus 10 that is also designed to determine the vertex power and/or to create a spatially resolved optical power map. Expressed differently, the apparatus 10 may be designed both to determine the vertex power and/or a spatially resolved optical power map and to determine the contour(s) of the grooves in the rims 12a. This offers the advantage that, for example, an optician can carry out a plurality of tasks or functions using a single piece of equipment.

A spectacle frame or spectacle frame 12 without lenses can be arranged in the apparatus 10 for the purposes of determining the contours of the rims. In a further measurement, the spectacle frame 12, this time including spectacle lenses, can be arranged in the apparatus once again in order to determine the vertex power and/or a spatially resolved optical power map.

Typically, the cameras are in the form of high resolution cameras with at least 10 megapixels. The apparatus is typically configured to simultaneously measure the optical power of the two spectacle lenses, inserted into the pair of spectacles, over the entire visual surface of the spectacle frame 12. The cameras are typically calibrated precisely to one another, for example with an accuracy of 1/10 mm or better, and are directed at a holding apparatus for holding the spectacle frame 12. In this case, the display of the illumination apparatus 14 can typically be configured to display an optical pattern such that an image or a plurality of images of the pattern can be captured through the spectacle lenses by means of the image capturing device 16 or by means of the cameras. Typically, the cameras are adjusted in such a way that the relative focal position is set accurately on the spectacle lenses of the spectacle frame 12.

Typically, the spectacle frame 12 can be held in position mechanically very precisely, and displaced and/or pivoted or turned, by means of the holding apparatus so that the image capturing device is able to capture images of the illuminated rims from at least two predetermined perspectives which allow a determination of the contours 34 of the grooves 12c in the rims 12a.

Typically, the apparatus, for example by means of a holding apparatus 28, facilitates at least one of the three mechanical movements, specified below, of the spectacle frame or spectacle frame 12 in relation to the cameras or in relation to the image capturing device 16:
  A) translation of the spectacle frame relative to the cameras (e.g., horizontally or vertically)
  B) rotation of the spectacle frame past the cameras (e.g., relative to a horizontally extending axis of rotation)
  C) combination of rotation and translation.

In this case, it is conceivable that the cameras are moved relative to the spectacle frame and/or the spectacle frame is moved relative to the cameras. In the case of rotation (option B and/or C), the axis of rotation may be located freely in space—that is to say the axis of rotation need not necessarily be located parallel to any one of the other straight lines or surfaces.

According to a particularly exemplary embodiment, the spectacle frame including its rims 12a is pivoted about a horizontal axis of rotation 200, the axis of rotation being arranged parallel to a connecting line that is perpendicular to the optical axes of the two cameras. What this facilitates is that the spectacle rims 12a are located both in the focal range and in the vertically and horizontally limited fields of view of the cameras, even in the case of a rotation.

A multiplicity of images of the rims are captured from a plurality of perspectives or viewing angles. Particularly typically, the apparatus and the method are configured in such a way that the rims are not shadowed in the various positions or arrangements in the field of view of the cameras. Additionally, a very precise mechanical holding apparatus (see FIG. 2, for example) is advantageous, by means of which the change in the positioning and/or orientation of the spectacle frame is rendered controllable, leading to a controllable positioning and/or orientation of the spectacle frame. In particular, the apparatus is typically embodied in such a way that the spectacle frame is affixed by the holding apparatus in such a way that the position and/or orientation of the spectacle frame 12 or the spectacle frame does not change, even in the case of a change of the positioning and/or orientation relative to the holding apparatus.

Figure 2:
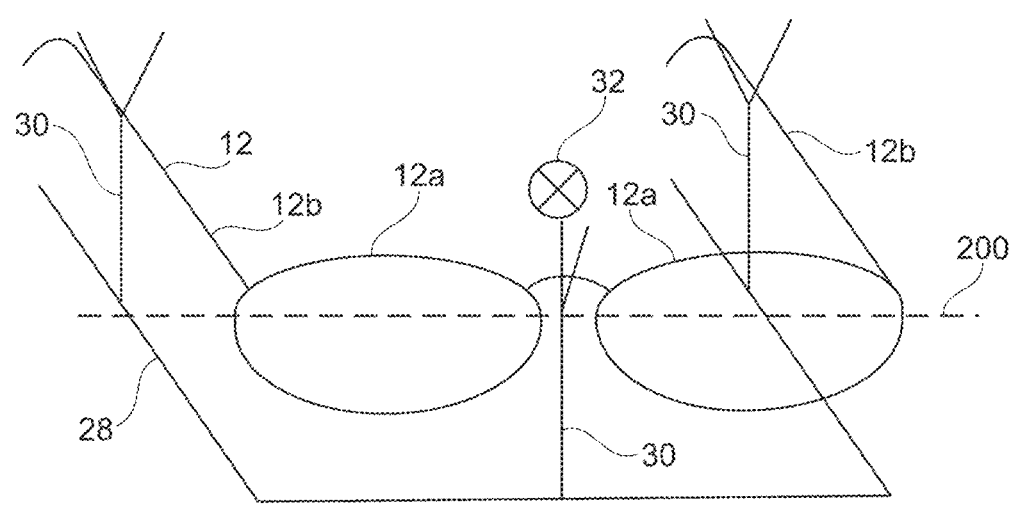
FIG. 2 shows a holding apparatus 28 according to an exemplary embodiment.

FIG. 2 shows a schematic representation of a holding apparatus 28 according to an exemplary embodiment, by means of which a spectacle frame 12 or spectacle frame can be held or fixed in an apparatus 10.

The holding apparatus 28 comprises three holding arms 30, by means of which the spectacle frame 12 can be held or fixed in a predetermined position and/or orientation relative to the image capturing device 16. According to the exemplary embodiment shown, one of the holding arms 30 fixes the nosepiece of the spectacle frame 12 while the other two holding arms 30 each fix one of the temples 12b. In this case, the spectacle frame 12 may simply be placed on the holding arms 30 as well. However, the holding arms 30 are typically designed in such a way that these securely fix the pair of spectacles and also secure the latter against slippage.

By way of example, the holding arms 30 may be changeable in terms of their height or length such that the spectacle frame 12 can at least partly be pivoted or rotated about the axis of rotation 200 within a specified angular range. By way of example, the lengths of the rear holding arms 30 may be extended and/or the front holding arm 30 may be shortened such that the spectacle frame 12 is tilted forward, and vice versa. To this end, the holding arms 30 may be in the form of telescopic arms, for example. Alternatively or in addition, the entire holding apparatus 28 may for example be designed to be rotatable or pivotable or tiltable in order to facilitate pivoting of the pair of spectacles 12 about the axis of rotation 200.

Additionally, the axis of rotation 200 may be arranged at a different location and/or extend in a different direction according to other embodiments. In this case, the holding apparatus 28 is then typically configured to pivot the spectacle frame 12 about the respective axis of rotation 200.

Further, the holding apparatus 28 according to the exemplary embodiment shown comprises a marker element 32, which is fixed in terms of its position and orientation relative to the holding apparatus 28. Additionally, the apparatus 10 is typically configured and calibrated in such a way that the position and orientation of the marker element relative to the image capturing device is precisely known (in the various perspectives) in order to be able to determine, as exactly as possible, an accurate position of the contour of the rims 12a in the images captured by the image capturing device 16, even though the relative position and/or orientation of the spectacle frame 12 was not initially determined exactly in relation to the image capturing device 16. Expressed differently, the marker element 32 can typically serve to provide a reference point for determining the accurate position and/or orientation of the contour(s) of the spectacle frame 12.

Figure 3A:
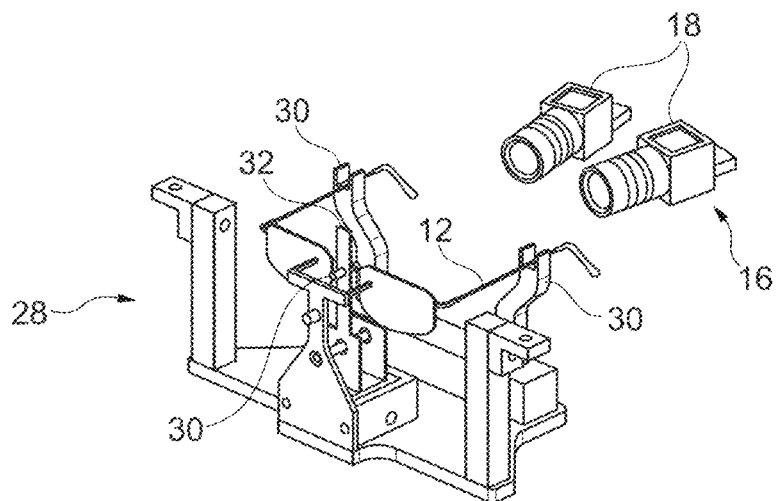
FIGS. 3A to 3C show a holding apparatus 28 of an apparatus 10 according to an exemplary embodiment in three different perspective representations.
Figure 3B:
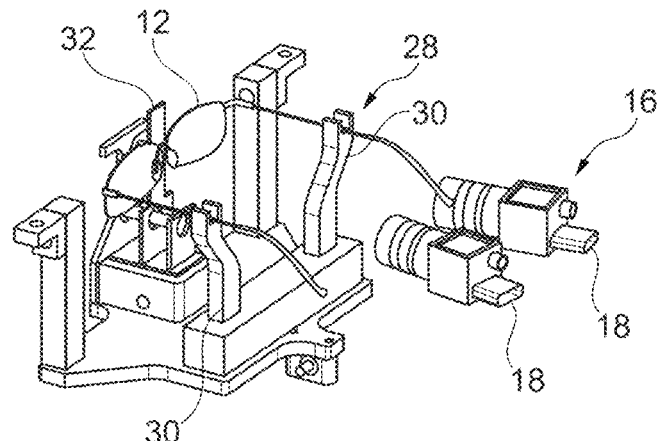
Figure 3C:
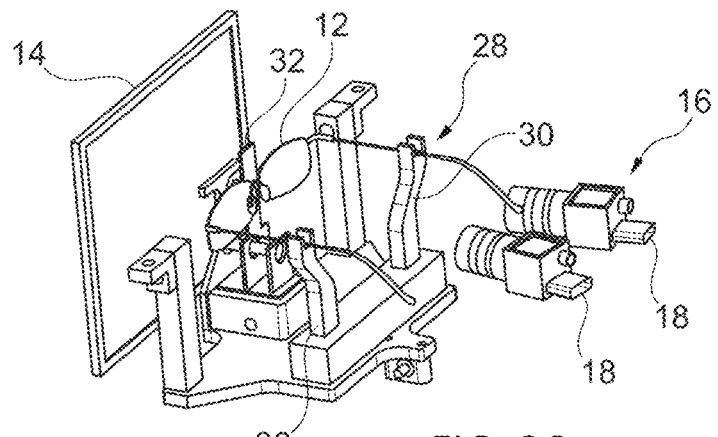

FIGS. 3A to 3C show a holding apparatus 28 of an apparatus 10 according to an exemplary embodiment in three different perspective representations.

In this case, the spectacle frame 12 is fastened in a holding apparatus 28 in such a way that three holding arms 30 of the holding apparatus 28 fix the spectacle frame 12. According to the exemplary embodiment shown, the back two holding arms 30, which fix the temples 12b of the pair of spectacles, have a rigid form. The front holding arm 30, by contrast, has a movable design and allows the rims 12a to be raised and/or lowered in order to facilitate the capture of images of the rims 12a from a different perspective. The main grip for fixing the spectacle frame 12 is accordingly implemented in clamping fashion on the nosepiece of the spectacle frame, and this fixes the spectacle frame 12 even if its center of gravity changes. Further, if need be, the frame is clamped at both temples 12b such that flexible temples, for example in the case of Titanflex spectacles, do not cover the field of view of the image capturing device 16.

In this exemplary embodiment, the holding apparatus 28 holds the spectacle frame in a horizontal relative position in front of the cameras 18 of the image capturing device 16. From this relative position, the spectacle frame can be rotated through one or more predetermined angles about a horizontal axis of rotation, both upward and downward through precisely defined angles, for example by means of a stepper motor. During this time, the image capturing device makes recordings of the frame and its rims for each discretely adopted position.

To improve the reconstruction of the rim geometry, the algorithm can typically be assisted by means of various illumination setups for the rim. By way of example, use can be made of illuminations that comprise a fringe projection.

The marker element 32 is designed as an integral constituent part of the front holding arm 30, as a result of which fixed positioning and orientation of the marker element 32 relative to the holding apparatus 28 is achieved in a simple manner.

FIG. 3C moreover shows the illumination device 14 which provides the illumination for contactless determination of the contour(s) of the frame groove 12c and for determination of the vertex power and/or the spatially resolved optical power maps.

Figure 4A:
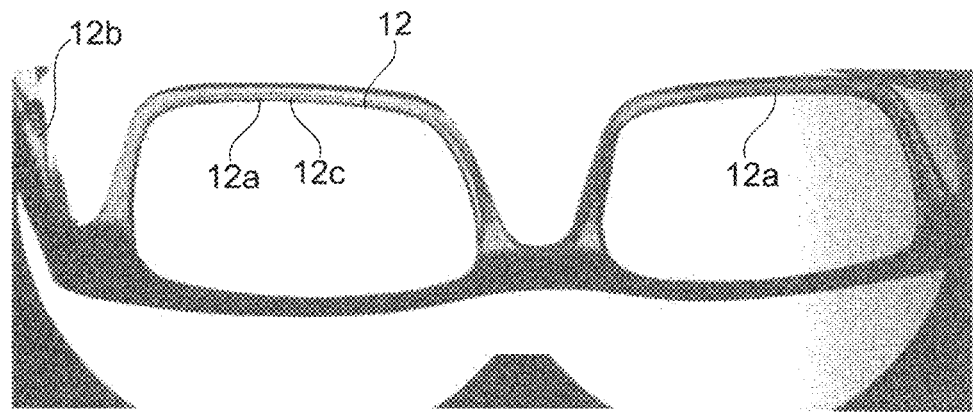
FIGS. 4A and 4B show images of a spectacle frame captured in exemplary fashion.
Figure 4B:
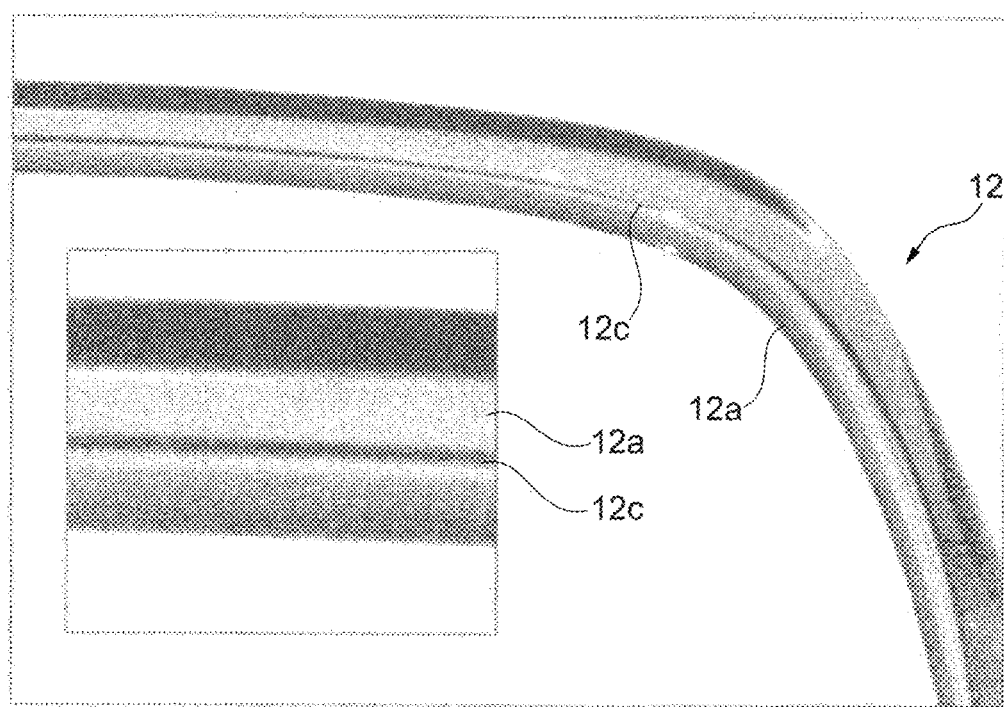

FIGS. 4A and 4B show, in exemplary fashion, captured images of the spectacle frame that show the rim 12a of the spectacle frame 12. The rims 12a were illuminated using transmitted light illumination in the process, allowing the frame groove 12c in the respective rims 12a to emerge clearly in the images. FIG. 5B shares two magnified views of sections of one of the rims 12a, which show the frame groove 12c even more clearly. In particular, what is recognizable here is that the frame grooves 12c can be recognized on the basis of shadowing of different portions since the frame grooves 12c cause shadowing under illumination on account of the depression. Therefore, the shadowing can be recognized and detected in the captured images as portions by way of different levels of shadowing or different levels of brightness. Portions with the same shadowing can therefore typically be assigned to a surface element with high accuracy.

The images captured by the image capturing device from different predetermined perspectives, which may be respectively available as depicted in FIGS. 4A and 5B, are then supplied to the image evaluation unit. The evaluation of the captured images is explained in exemplary fashion below on the basis of an exemplary embodiment.

An image evaluation based on known methods for image segmentations is designed to detect the image regions belonging to individual portions or surface segments of the rim or frame groove. Suitable methods are known in the prior art and are described, for example, in the online encyclopedia Wikipedia under the term "Image segmentation."

By way of example, the following procedure can be used in this context:
rim segmentation, in particular with the aid of an image recorded using transmitted light and a foreground/background segmentation;
edge detection within the segmented rim with preference given to edges extending virtually parallel to the rim;
completion of the edges with the aid of an optimization method, within the scope of which a cost function is minimized.

As a result of the image evaluation there can be, for example, a set of surface elements F1 to F4 and/or of spatial curves K1, K2, K3, K4, and K5 and, for each image in the image stack, a point list of spatial points or a polygonal chain of pixels. By way of example, these are transmitted to the geometry evaluation unit.

By way of example, edge detection can be carried out with the aid of an appropriately trained neural network. In the process, a human expert for example annotates the rim and the edges of a plurality of frames that are as different as possible. Subsequently, a neural network is trained on the basis of these data, for example, in such a way that the rim and the edges in the image belonging to the spatial curves K1 to K5 are determined in the image in the case of unknown frames. In this case, a two-stage method, for example, is advantageous, with the rim in each case being determined first in the overall image and a set of image windows being determined along the rim on the basis of the rim. The use of fixed size image windows is advantageous. The edges belonging to the spatial curves K2, K3, K4 in the image are consequently respectively determined within the image windows.

Other machine learning methods can also be used instead of a neural network, for instance a principal component analysis (PCA) and support vector machines (SVM).

Figure 5:
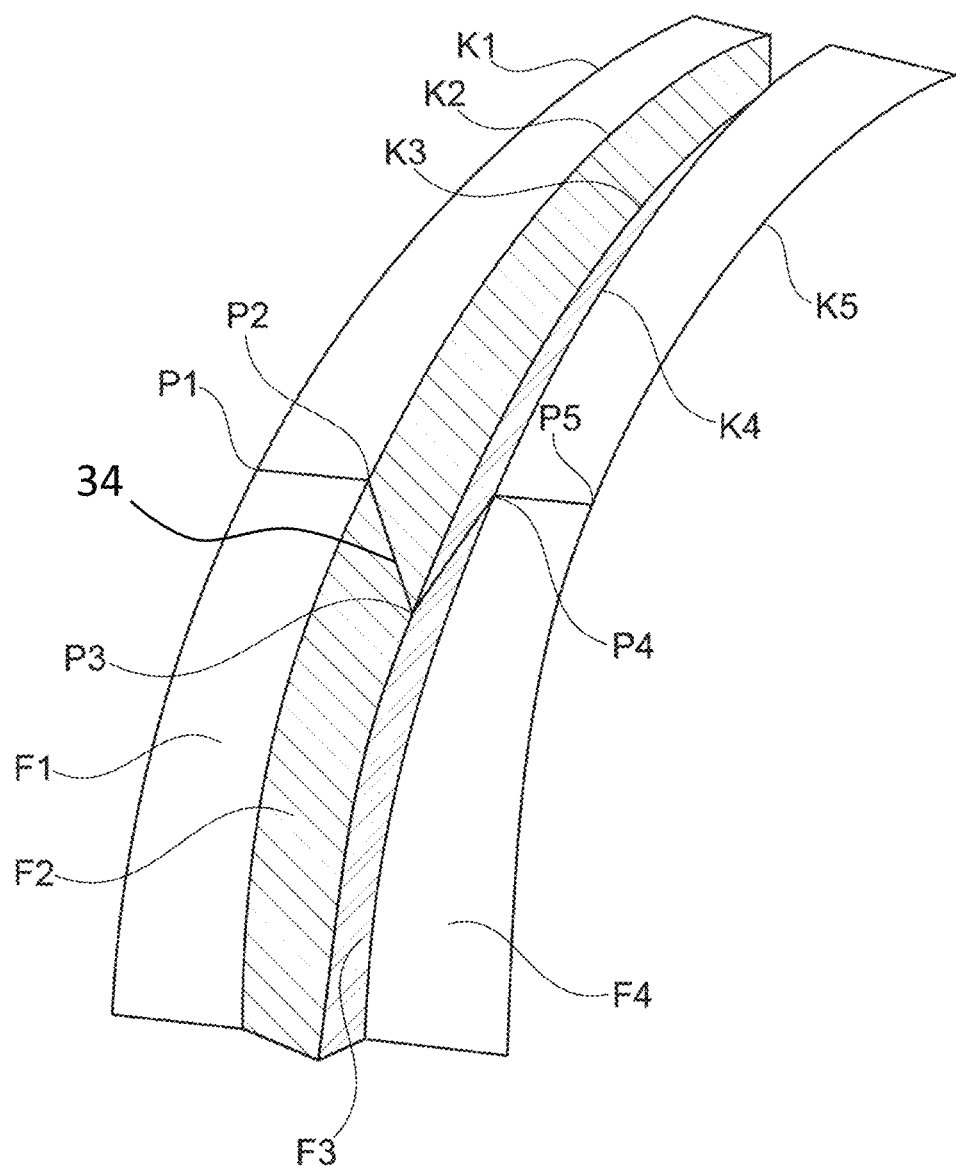
FIG. 5 shows a schematic representation of a contour, determined or reconstructed in exemplary fashion, of a frame groove 12c in a rim.

FIG. 5 shows a schematic representation of a determined or reconstructed contour of a frame groove 12c in a rim. A V-shaped profile section of the contour was assumed in exemplary fashion and used as a basis for determining the shape edge contour for the purposes of determining or reconstructing the contour 34. In the cross section, the contour is defined or determined by the spatial points P1 to P5. In this case, the spatial points P1, P2, P4, and P5 characterize the rim while P3 determines the base of the notch or depression of the frame groove 12c. The "V-shape" of the groove is therefore spanned, in particular, by spatial points P2, P3, and P4 depicted in exemplary fashion. Even though the exemplary spatial points P1 to P5 are only depicted for one cross-sectional position along the contour, each cross-sectional position naturally has corresponding spatial points. The relative position of the spatial points P1 to P5 is in this case determined by linking of the respective points in the images captured from different predetermined perspectives. This can be implemented by means of triangulation.

Further, the contour is determined by the spatial curves K1 to K5, with the spatial curves K1 to K5 extending through the respective spatial points P1 to P5 and through all other spatial points arranged on the respective position of the cross section. Expressed differently, the spatial curve K1 extends through the spatial point P1 and through all points which in the cross section through the rim correspond to the point P1 at other positions along the rim. A corresponding statement applies to spatial curves K2 to K5 and the spatial points P2 to P5. Moreover, surface segments F1 to F4 which extend between the respective adjacent spatial curves are modeled according to the described exemplary embodiment. By way of example, the surface segment F1 extends between the spatial curves K1 and K2, etc.

On the basis of the spatial curves K1 to K5 and, in particular, on the basis of the surface segments F1 to F4, it is subsequently possible to reproduce or determine the contour 34 of the frame groove 12c and provide the latter as information for adapting the respective spectacle lens, for example for grinding.

Figure 6:
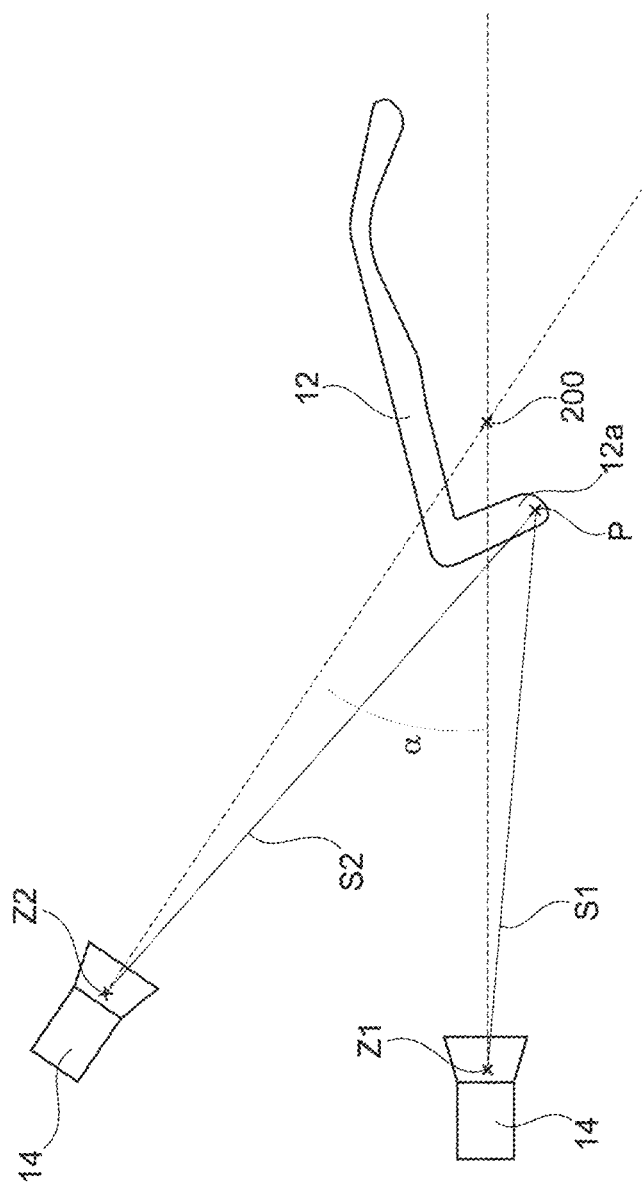
FIG. 6 shows an exemplary representation of an image capture from different perspectives.

FIG. 6 shows a schematic illustration of the capture of a plurality of images of the illuminated rim 12a from different predetermined perspectives according to an exemplary embodiment.

In this case, the image capturing device 16 is directed at the spectacle frame 12 or the rim 12a from two different perspectives, the two perspectives differing by virtue of the image capturing device 16 being directed at the spectacle frame 12 from different positions or orientations. In this case, the different positions or orientations or perspectives correspond to different angle positions about the axis of rotation 200, the different angle positions including an angle α.

Even though two image capturing devices 16 are depicted in FIG. 6, this may be a single image capturing device 16 which is arranged at different positions relative to the spectacle frame 12 in the two cases. The different positions of the image capturing device 16 relative to the spectacle frame 16 can be realized by a movability of the spectacle frame 12 and/or the image capturing device 16. Here, the optical axis of the image capturing device 16 is depicted as a dashed line in each case. The image capturing device 16 typically comprises two cameras, which are directed at a respective rim 12a of the spectacle frame of the spectacle frame 12.

An exemplary method for calibration purposes and for determining the contours of the frame grooves of the spectacle frame 12 or of the function of the geometry evaluation unit is explained below on the basis of FIG. 6.

There is an intrinsic calibration in a first step, wherein the image capturing device 16 in particular is calibrated such that the assignment of camera pixels of the cameras of the image capturing device 16 to lines of sight is known in the coordinate system of the respective camera. Exemplary lines of sight are denoted by S1 and S2.

Further, the position and orientation of the axis of rotation 200 is calibrated relative to the cameras of the image capturing device 16 in the various positions and/or orientations about the axis of rotation 200. This can either be implemented within the scope of a calibration step with the aid of a calibration object having the known geometry, e.g., with a board with a checkerboard pattern printed thereon, or with the aid of a marker element 32 that has a fixed spatial relationship with the frame (see FIG. 2, for example), the spatial position and orientation of the marker element relative to the image capturing device 16 being able to be determined with the aid of a single recorded image. Overall, the positions of the optical centers Z1 and Z2 and of the axis A in space are known following this step. An assignment of camera pixels of the two images, that is to say the images from the two different perspectives, to lines of sight in space is known following this step.

Moreover, epipolar planes are determined for the purposes of determining the linking of camera pixels of the image from the first prospective to planes of camera lines of sight of the image from the second perspective. Such a method is known as epipolar geometry in the prior art and is explained, for example, in the Wikipedia online encyclopedia. The overall set of epipolar planes always extends through both optical centers Z1 and Z2. A determination of the linking of pixels of the first image to sets of pixels on the second image (in general, these pixel sets form epipolar curves; if additional image distortion correction is used within the scope of the intrinsic calibration, they form epipolar lines; these are located on the image columns of the second camera image if additional image rectification is used).

Furthermore, a pixel Q1 is selected in the first camera image, that is to say the camera image from the first perspective, the pixel belonging to any sought-after spatial point P on the rim on a spatial curve Kj. As a basis for the selection of the pixel Q1, the polygonal chains assigned to spatial curves provided by the image evaluation unit are.

Then, an epipolar plane and a set of points M2 of pixels of the second camera image, that is to say of the image from the second perspective, are determined, which are respectively assigned to the pixel Q1 or linked to the latter Consequently, the epipolar plane contains the line of sight S1 in particular. In particular, the epipolar plane contains the sought-after spatial point P.

Subsequently, the pixel Q2 is determined from the set of points M2 on the basis of a polygonal chain to the spatial curve Kj in the second image. In the process, a point of intersection for example can be determined, wherein the epipolar curve or the epipolar plane to M2 is intersected by the polygonal chain. If image rectification is used, the representation of the polygonal chain can already be chosen on the basis of the image columns, and so the associated pixel can be read directly.

Moreover, there is a triangulation of the lines of sight S1 and S2. With the knowledge of Q1 and Q2, the line of sight S1 can be determined from Q1 and the line of sight S2 can be determined from Q2 with the aid of the calibration information from the intrinsic calibration. In this case, the point in space with the smallest distance from S1 and S2 forms an approximate value for the sought-after point P.

The described method can subsequently be carried out iteratively for all spatial points of the spatial curves in order to acquire the entire contour.

Efficient determination of the epipolar planes arises by the use of an image distortion correction within the scope of the intrinsic calibration and the use of image rectification within the scope of determining the epipolar planes such that the epipolar planes which are assigned to the pixels of an image column in the first image are identical to one another, and conversely the epipolar planes which are assigned to the camera pixels of an image column in the second image are likewise identical.

If more than two predetermined perspectives are used, the construction of epipolar line images is typically recommended for a more efficient calculation.

The triangulation of the lines of sight is carried out together for all spatial points P of a spatial curve, the criterion of the smallest distance being included as an optimization target in the form of a term of a cost function in an iterative optimization. Additional terms can typically be included in the cost function, for example a smoothness condition for the spatial curves. Since the groove is created within the scope of a manufacturing process, it is possible for example to make certain assumptions in respect of smoothness. In this case, a numerical calculation of tangential vectors at the spatial curves can be carried out and a measure of the differences between adjacent tangential vectors can be incorporated in the cost function. Statistical measures are also possible, for example with the aid of principal component analysis over a plurality of known groove shapes in spectacle frames.

To estimate the accuracy of the relative position of the contour curves of the groove profile, the following data were used according to the exemplary embodiment explained in exemplary fashion:

Image size of the camera [pixels]: 3840×2748 (10.6 MP)

Field of view [mm]: 150×107.3

Object-side pixel dimension [mm]: 0.039

No sub-pixel accurate detection is estimated for the accuracy of the edge detection on account of the defocus and an optionally arising low contrast of the contour line generated by the differences in the shadowing. In this case, the object-side pixel dimension is estimated as a measure for the inaccuracy.

By contrast, sub-pixel-accurate detection techniques can be used for greater accuracy in the case of contour lines with a high contrast. In industrial metrology it is possible to estimate sub-pixel accuracies of approximately $\frac{1}{5}$ to $\frac{1}{20}$-th pixel (see, e.g., ZEISS O-SELECT: object pixel size approximately 35 μm; specified measurement accuracy 4.5 μm; see "www.zeiss.de/messtechnik/produkte/systeme/op-tische-messtechnik/o-select.html" and "applications.zeiss.com/C1257A26006EFF9E/0/A6DDC43030E4AAFBC1257F0100378040/$FILE/O-SELECT_DE_60_020_0003I.pdf"), retrieved on Sep. 30, 2019.

A technique for contour determination with sub-pixel accuracy is the sub-pixel Canny edge filter [see: Rafael Grompone by Gioi, Gregory Randall: "A Sub-Pixel Edge Detector: an Implementation of the Canny/Devernay Algorithm," 2017, "www.ipol.im/pub/art/2017/216/article_lr.pdf"]. See Wikipedia for further techniques: en.wikipedia.Org/wiki/Edge_detection#Subpixel, retrieved on Sep. 30, 2019.

Additionally, there was an estimate of the three-dimensional error during triangulation.

When the frame is rotated through an angle β=30 degrees for the purposes of determining the spatial points of the contour curves by means of triangulation, the following relationship is obtained for determining the error Δz in the direction of the optical axis of the camera, denoted "z-direction" below:

$$\tan\beta = \frac{\Delta x}{\Delta z}$$

or $$\Delta z = \frac{\Delta x}{\tan\beta}$$

In the case of β=30 degrees and a lateral error in the contour detection of Δx=40 μm, a deviation in the z-direction of Δz=1.73 Δx=69 μm is consequently obtained.

Moreover, in practice, the profile or the contour of the groove can deviate from the V-shape assumed in exemplary fashion, to the extent that the tip of the V has a radius of curvature.

Figures 7A, 7C:
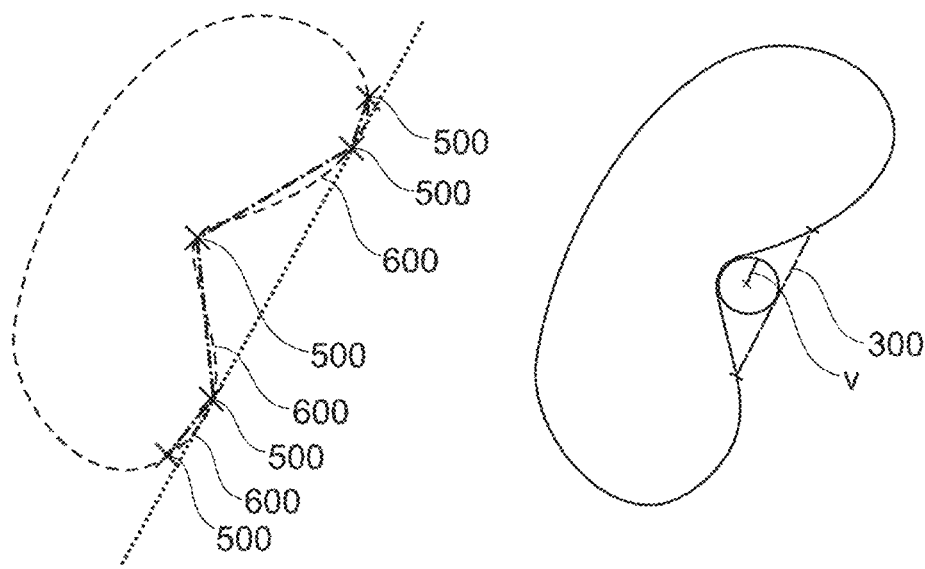
FIGS. 7A to 7C show exemplary explanations in relation to modeling the contour.

A CT scan of a metal frame has been used below as an example. FIG. 7A shows, in exemplary fashion, a cross section of the rim of the spectacle frame captured by means of a CT scan, in the case of which the tip or the base of the frame groove has a radius of curvature r of 0.15 mm. The V-angle has an angle of approximately 80°. The measurement of the length of the distance 300, which denotes the distance between the two upper ends of the "V," yielded 0.9 mm.

Figure 7B:
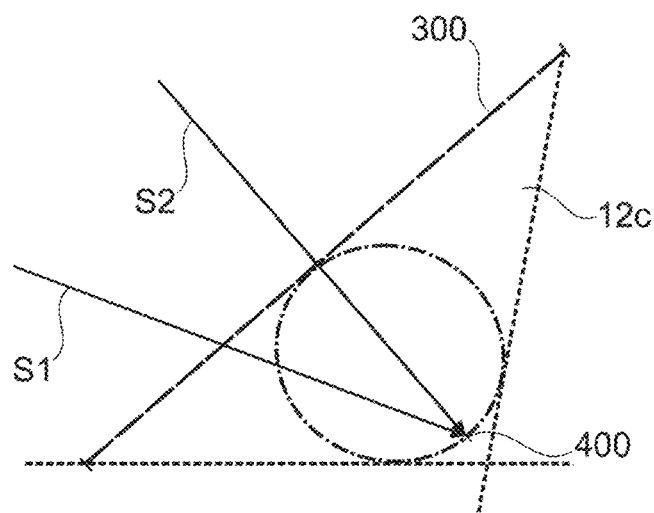

When the groove base is observed from two different predetermined perspectives, for example along the lines of sight S1 and S2, the center of the grayscale value transition or brightness transition is identical to the center of the groove base in this model (see FIG. 7B). A similar statement applies to all grayscale value transitions or brightness transitions used for the measurement. Overall, this yields a polygonal chain model for the contour of the frame groove, the nodes 500 of the polygonal chain being located on the centers of the arcs 600 of the of the frame groove 12c, as illustrated in exemplary fashion in FIG. 7C.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of" The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Apparatus
12 Spectacle frame
12a Rim of the spectacles
12b Temples of the spectacles
12c Frame groove
14 Illumination device
16 Image capturing device
18 Camera
20 Computing unit 22 Image evaluation unit
24 Geometry evaluation device
26 Housing
28 Holding apparatus
30 Holding arm
32 Marker element
34 Contour
100 Focal region of the image capturing device
200 Axis of rotation
300 Connecting path between the upper ends of the "V"
400 Position of the grayscale value transition
500 Nodes
600 Arcs
S1, S2 Lines of sight
Z1, Z2 Optical centers of the image capturing device 16
Q1 Pixel in the first camera image
Q2 Pixel in the second camera image
P Spatial point on the rim

What is claimed is:

1. A method for determining a contour of a frame groove in a rim of a spectacle frame, the method comprising:
   illuminating the rim of the spectacle frame;
   capturing a plurality of images of the illuminated rim from different predetermined perspectives;
   evaluating the plurality of captured images and determining spatial curves describing the frame groove based on the plurality of evaluated images; and
   determining the contour of the frame groove based on the spatial curves,
   wherein the rim is illuminated simultaneously along an entire circumference of the rim with directed illumination;
   wherein the evaluation of the plurality of captured images includes recognizing portions of the spectacle frame contained in the captured images and an assignment of each portion contained in the captured images to a respective surface element of the frame groove based on a brightness and/or a shading of the respective portion, wherein recognizing the portions includes:
   a rim segmentation;
   a detection of edges, which bound the portions and surface elements within the segmented rim, with preference given to edges extending virtually parallel to the rim; and
   a completion of the edges with a first optimization method in which a cost function is minimized, and wherein determining the spatial curves includes:
     determining spatial points, which describe the frame groove and through which the spatial curves extend, based on the surface elements, the spatial points being located on edges which bound the portions and the surface elements; and
     determining a relative position of the spatial points in space by triangulation, the triangulation being carried out collectively for all spatial points of a spatial curve of the plurality of spatial curves, wherein a criterion of a smallest distance as an optimization goal in form of a term of the cost function is included in an iterative optimization with a second optimization method.

2. The method as claimed in claim 1, wherein the completion of the edges comprises collectively triangulating lines of sight for all spatial points of a spatial curve of the contour.

3. The method as claimed in claim 1, wherein the rim is illuminated such that the illumination is incident on the rim from the outside.

4. The method as claimed in claim 1, wherein the directed illumination is incident on the spectacle frame from only one direction relative to an image capturing device.

5. The method as claimed in claim 1, wherein directed illumination is incident as incident light from one direction on the spectacle frame, in which direction an image evaluation unit is arranged relative to the spectacle frame.

6. The method as claimed in claim 1, wherein the directed illumination is provided by an illumination device having one or more point light sources, the illumination device illuminating the rim from a predetermined direction and creating shadowing which is as precise as possible on the frame groove.

7. The method as claimed in claim 1, wherein the directed illumination is selected from collimated illumination, transmitted light illumination, incident light illumination, ultraviolet illumination, or polarized illumination.

8. The method as claimed in claim 1, wherein the plurality of images are captured such that the image capturing device captures two rims of a spectacle frame in the image region.

9. A method for grinding a spectacle lens into a spectacle frame, wherein a contour of a frame groove in a rim of the spectacle frame is determined with the method as claimed in claim 1.

10. A computer-implemented method for determining a geometry of a spectacle lens, comprising determining a contour of a frame groove in a rim of a spectacle frame with the method as claimed in claim 1.

11. An apparatus for contactless determination of a contour of a frame groove in a rim of a spectacle frame, the apparatus comprising:
    an illumination device configured to illuminate the rim of the spectacle frame;
    an image capturing device configured to capture a plurality of images of the illuminated rim from different predetermined perspectives;
    an image evaluation unit configured to evaluate the plurality of captured images, to determine the spatial curves describing the frame groove on the basis of the evaluated images, and to determine the contour of the frame groove based on the spatial curves,
    wherein the illumination device is configured to illuminate the rim simultaneously along an entire circumference of the rim with directed illumination;
    wherein the evaluation of the plurality of captured images includes recognizing portions of the spectacle frame contained in the captured images and an assignment of each portion contained in the captured images to a respective surface element of the frame groove based on a brightness and/or shading of the respective portion,
    wherein recognizing the portions includes:
    a rim segmentation;
    a detection of edges which bound the portions and surface elements within the segmented rim, with preference given to edges extending virtually parallel to the rim; and
    a completion of the edges with a first optimization method in which a cost function is minimized; and
    the image evaluation unit is further configured such that the determination of the spatial curves includes:
    to determine spatial points, which describe the frame groove and through which the spatial curves extend, based on the surface elements, the spatial points being located on edges which bound the portions and the surface elements; and to determine a relative position of the spatial points in space by triangulation, the triangulation being carried out collectively for all spatial points of a spatial curve of the plurality of spatial curves and a criterion of a smallest distance as an optimization goal in the form of a term of a cost function is included in an iterative optimization with a second optimization method.

12. The apparatus as claimed in claim 11, wherein the image evaluation unit is further configured such that the completion of the edges comprises collectively triangulating lines of sight for all spatial points of a spatial curve of the contour.

13. The apparatus as claimed in claim 11, wherein the apparatus is configured such that the illumination is incident on the rim from the outside when the rim is illuminated.

14. The apparatus as claimed in claim 11, wherein the apparatus is configured such that the directed illumination is incident on the spectacle frame from only one direction relative to an image capturing device when the rim is illuminated.

15. The apparatus as claimed in claim 11, wherein the apparatus is configured such that the directed illumination is incident as incident light on the spectacle frame when illuminating the rim, the incidence being from a direction in which an image evaluation unit is arranged relative to the spectacle frame.

16. The apparatus as claimed in claim 11, wherein the illumination device comprises one or more point light sources for providing the directed illumination and wherein the illumination device is configured to illuminate the rim from a predetermined direction and to create shadowing which is as precise as possible on the frame groove.

17. The apparatus as claimed in claim 16, wherein the one or more point light sources are each in the form of one of the following elements: an incandescent lamp, an LED, a laser diode, and a laser.

18. The apparatus as claimed in claim 16, further comprising one or more light sources which facilitate transmitted light illumination for the rim.

19. The apparatus as claimed in claim 11, wherein the directed illumination is selected from a collimated illumination, a transmitted light illumination, an incident light illumination, an ultraviolet illumination, and a polarized illumination.

20. The apparatus as claimed in claim 11, wherein the image capturing device is configured to capture two rims of a spectacle frame in the image region when capturing the plurality of images.

21. The apparatus as claimed in claim 11, further comprising a holding apparatus, the holding apparatus being configured to hold the pair of spectacles fixed in position and fixed in orientation relative to the illumination device and relative to the image capturing device.

22. The apparatus as claimed in claim 21, wherein the holding apparatus is further configured to hold the pair of spectacles in at least two different orientations relative to the illumination device and relative to the image capturing device, the at least two different orientations defining different predetermined observation angles of the image capturing device in relation to the rim.

23. The apparatus as claimed in claim 22, wherein the apparatus is further configured to determine at least one of the two following properties of a spectacle lens mounted in a spectacle frame that is held in the apparatus: vertex power and spatially resolved optical power map.

24. The apparatus as claimed in claim 11, wherein the image capturing device comprises at least one camera and wherein the optical axis of the at least one camera extends through one of the two rims or contours or through the opening of the pair of spectacles spanned by the respective rim.

* * * * *